United States Patent
Sakamaki et al.

[11] Patent Number: 6,013,961
[45] Date of Patent: Jan. 11, 2000

[54] ELECTRIC MOTOR HAVING ROTATION DETECTION SENSOR

[75] Inventors: Ryousuke Sakamaki, Toyohashi; Masanori Ohishi, Hamamatsu; Hirokazu Tsuda, Toyohashi, all of Japan

[73] Assignee: Asmo Co., Ltd., Shizuoka-pref, Japan

[21] Appl. No.: 09/258,092

[22] Filed: Feb. 24, 1999

[30] Foreign Application Priority Data

Mar. 18, 1998 [JP] Japan .................................. 10-068472

[51] Int. Cl.$^7$ .................................................. H02K 11/00
[52] U.S. Cl. ........................................ 310/68 B; 310/177
[58] Field of Search ............................... 310/68 B, 67 R, 310/177, 40 MM; 324/174

[56] References Cited

U.S. PATENT DOCUMENTS

| | | | |
|---|---|---|---|
| 3,570,116 | 3/1971 | Armstrong et al. | 29/596 |
| 3,796,899 | 3/1974 | Giachello | 310/156 |
| 4,110,676 | 8/1978 | Edick et al. | 322/31 |
| 4,259,603 | 3/1981 | Uchiyama et al. | 310/68 B |
| 4,499,420 | 2/1985 | Shiraki et al. | 324/174 |
| 4,857,784 | 8/1989 | Mukaekubo | 310/68 B |
| 4,935,652 | 6/1990 | Maxa | 310/68 B |
| 5,079,468 | 1/1992 | Sata | 310/168 |
| 5,184,038 | 2/1993 | Matsui et al. | 310/42 |
| 5,565,721 | 10/1996 | Knappe | 310/68 B |
| 5,717,268 | 2/1998 | Carrier et al. | 310/156 |

FOREIGN PATENT DOCUMENTS

| | | |
|---|---|---|
| 0 359 853 B1 | of 1988 | European Pat. Off. . |
| 057767 A1 | 6/1993 | European Pat. Off. . |
| 5-161314 | of 1993 | Japan . |
| 5-199724 | 8/1993 | Japan . |
| 6-29374 U | of 1994 | Japan . |
| 6-74074 U | of 1994 | Japan . |
| 6-217497 | 8/1994 | Japan . |
| 6-327195 | 11/1994 | Japan . |

*Primary Examiner*—Nestor Ramirez
*Assistant Examiner*—Joseph Waks
*Attorney, Agent, or Firm*—Fish & Richardson P.C.

[57] ABSTRACT

In an electric motor having a rotation detection sensor, a pair of engagement recesses are provided on an axial end surface of a resin cylindrical body of a commutator. A permanent magnet is held around a rotary shaft of the motor with its one axial end surface being in abutment with the axial end surface of the cylindrical body. A pair of engagement recesses is provided on the other axial end surface of the magnet. A resin busing having a cylindrical part and a disk part is fitted on the rotary shaft at the side of the other axial end surface of the magnet. A pair of engagement protrusions is formed on the cylindrical part to be engaged with the engagement recesses of the cylindrical body, thereby restricting a relative movement between the bushing and the cylindrical body. Further, a pair of engagement protrusions is formed on the disk part to be engaged with the engagement recesses of the magnet, thereby restricting a relative movement between the bushing and the magnet. Thus, the magnet of the rotation sensor is fixedly mounted around the rotary shaft without using an adhesive bond.

10 Claims, 10 Drawing Sheets

ELECTRIC MOTOR HAVING ROTATION DETECTION SENSOR

CROSS REFERENCE TO RELATED APPLICATION

This application relates to and incorporates herein by reference Japanese Patent Application No. 10-68472 filed on Mar. 18, 1998.

BACKGROUND OF THE INVENTION

1. Field of the Invention

The present invention relates to an electric motor having a rotation detection sensor and, more particularly, to an improvement in mounting a rotary member of a rotation detection sensor on a motor rotary shaft.

2. Related Art

It is known to provide a rotation detection sensor in an electric motor. As shown in FIG. 22, this type of motor 21 has an annular permanent magnet 24 fixed around a rotary shaft 23 of an armature 22, so that it operates as a rotary member of the rotation detection sensor. The magnet 24 is bonded to a metal bushing 25 by an adhesive bond, and press-fitted on the rotary shaft 23 together with the bushing 25.

This arrangement requires a high press-fitting precision, so that the busing 25 is fitted fixedly on the rotary shaft 23. That is, a through hole 25a of the bushing 25 and the rotary shaft 23 must be machined with high precision. Further, it is necessary to bond the magnet 24 and the bushing 25, and to dry the adhesive bond thereafter.

Further, a resin washer 27 is disposed between the magnet 24 and a bearing 26 supporting one end of the rotary shaft 23 therein, thereby preventing the magnet 24 from sliding on the bearing 26 directly. This results in increases in the number of component parts, in the number of production processes, and in production cost.

SUMMARY OF THE INVENTION

It is therefore an object of the present invention to provide an electric motor having a rotation detection sensor, which can be produced with less number of component parts and less number of production processes to reduce production cost.

According to the present invention, an electric motor has a rotation detection sensor, a permanent magnet of which is mounted on a rotary shaft supporting thereon an armature and a commutator. A bushing is mounted on the rotary shaft between a bearing and the magnet. The bushing is shaped to directly engage with the commutator, sandwiching the permanent magnet tightly therebetween.

Preferably, a pair of engagement recesses is provided on an axial end surface of a resin cylindrical body of the commutator. A pair of engagement recesses is provided on the magnet. The bushing is in an integral unit of a cylindrical part and a disk part extending from the cylindrical part. A pair of engagement protrusions is formed on the cylindrical part to be engaged with the engagement recesses of the cylindrical body, thereby restricting a relative movement between the bushing and the cylindrical body. Further, a pair of engagement protrusions is formed on the disk part to be engaged with the engagement recesses of the magnet, thereby restricting a relative movement between the bushing and the magnet. Thus, the magnet of the rotation sensor is fixedly mounted around the rotary shaft without using an adhesive bond.

BRIEF DESCRIPTION OF THE DRAWINGS

Other objects, features and advantages of the present invention will be made more understandable by the following detailed description made with reference to the accompanying drawings, throughout which the same or similar reference numerals designate the same or similar component parts. In the drawings.

DETAILED DESCRIPTION OF THE PREFERRED EMBODIMENT

Figure 1:
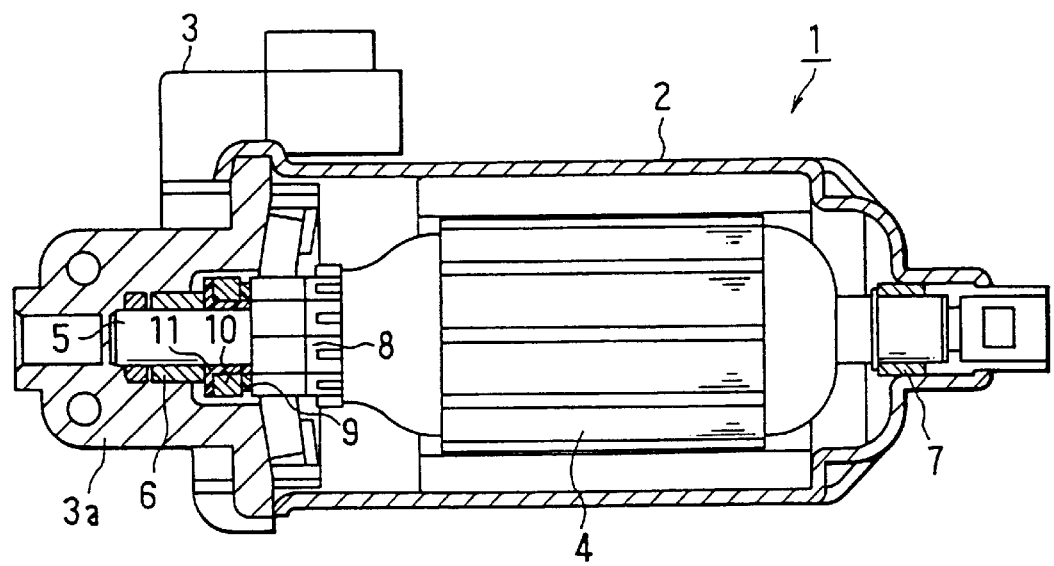
FIG. 1 is a schematic sectional view showing an electric motor according to an embodiment of the present invention.
Figure 2:
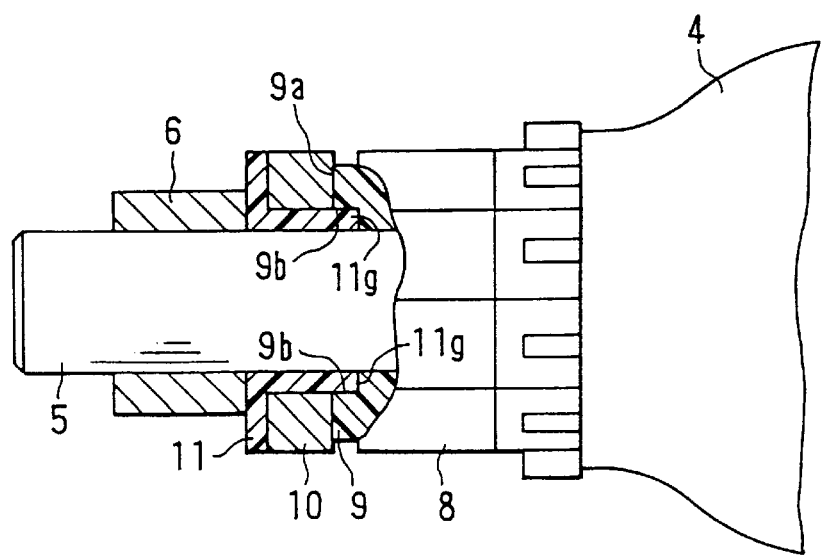
FIG. 2 is an enlarged view showing a part of the motor shown in FIG. 1.

Referring first to FIGS. 1 and 2, an electric motor 1 has a cylindrical stator (yoke and permanent magnets) 2 and a holder 3a of a rotation detection sensor 3. The motor 1 may be used to drive a power seat in a vehicle in such a manner that the rotation detection sensor 3 detects motor rotation which represents a power seat position. An armature 4 having a rotary shaft 5 is disposed within the stator 2 and the holder 3a. The rotary shaft 5 is supported rotatably by bearings 6, 7. A commutator 8 is fixed on the rotary shaft 5 through a cylindrical body 9 made of resin.

Figure 3:
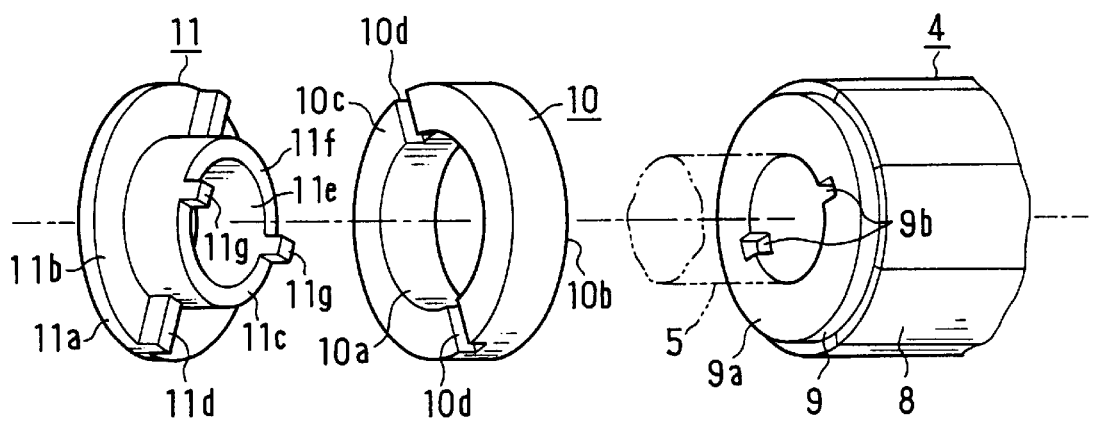
FIG. 3 is a perspective view showing component parts of the motor before assembling.
Figure 4:
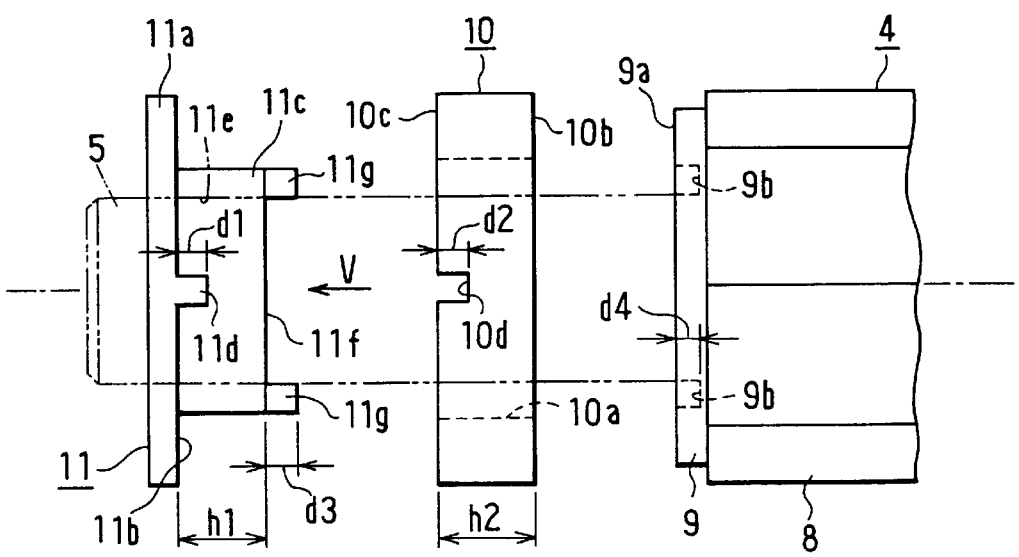
FIG. 4 is a side view showing the component parts shown in FIG. 3.

As shown in FIGS. 3 and 4, the cylindrical body 9 has a pair of engagement recesses 9b on its one axial side surface 9a, which is axially opposite to the armature 4. The recesses 9b are provided symmetrically to face each other in the radial direction with respect to the rotary shaft 5. A permanent magnet 10, which is a rotary member of the rotation detection sensor 3, is disposed to abut with the axial end surface 9a.

The magnet 10 is formed into an annular shape having a through hole 1a with its one half and the other half being magnetized into N-pole and S-pole respectively. A pair of engagement recesses 10d are formed on an axial end surface 10c, which is axially opposite to the other axial end surface 10b abutting the end surface 9a of the cylindrical body 9. The recesses 10d are provided symmetrically to face each other in the radial direction with respect to the rotary shaft 5. The magnet 10 is fitted on a resin bushing 11 disposed between the cylindrical body 9 and the bearing 6.

The bushing 11 is formed to have a cylindrical part 11c, on which the magnet 10 is fitted, and a flange disk part 11a extending from the cylindrical part 11c. The cylindrical part 11c has a through hole 11e, in which the rotary shaft 5 is press-fitted. A pair of engagement protrusions 11d are formed on one axial end surface 11b of the disk part 11a. The protrusions 11d are provided symmetrically to face each other in the radial direction with respect to the rotary shaft 5. Each protrusion 11d has a square shape in section as shown in FIG. 4. A pair of engagement protrusions 11g are formed on one axial end surface 11f of the cylindrical part 11c. The protrusions 11g are provided symmetrically to face each other in the radial direction with respect to the rotary shaft 5. Although not shown, ribs may be formed on the axial end surface of the disk part 11a, which abuts with the bearing 6, so that the contact area between the disk part 11a and the bearing 6 may be reduced to reduce a friction loss.

Figure 5:
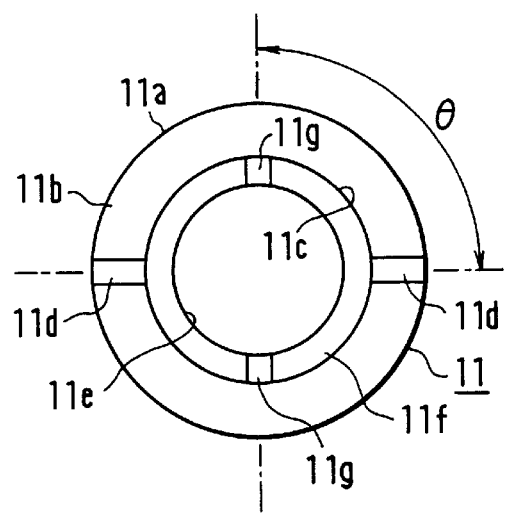
FIG. 5 is a front view showing a bushing viewed in the direction V in FIG. 4.

In this embodiment, the height d1 of each protrusion 11d is slightly less than the depth d2 of each recess 10d, while the circumferential width of each the protrusions 11d and that of each recess 10d are the same. Thus, the protrusions 11d and recesses 10d are engaged tightly without backlash. The height h1 of the cylindrical part 11c is slightly less than the thickness h2 of the magnet 10. The diameter of the through hole 11e is so set as to fit on the rotary shaft 5. The outer diameter of the cylindrical part 11c is the same as the diameter of the through hole of the magnet 10. The height d3 of each protrusion 11g is slightly less than the depth d4 of each recess 9b of the cylindrical body 9. The circumferential width of each protrusion 11g and that of each recess 9b are the same. Thus, the protrusions 11g are engaged tightly with the recesses 9b without backlash. The protrusions 11g are displaced 90° from the protrusions 11d in the circumferential direction as shown in FIG. 5.

In assembling the magnet 10 on the rotary shaft 5, the cylindrical part 11c of the busing 11 is inserted first into the through hole 10a of the magnet 10 so that the protrusions 11d of the bushing 11 fits in the recesses 10d of the magnet 10. Next, the bushing 11 fitted with the magnet 10 is press-fitted on the rotary shaft 5, while engaging the protrusions 11g of the busing 11 into the recesses 9b of the cylindrical body 9. Thus, the magnet 10 is sandwiched between the cylindrical body 9 and the bushing 11 with its axial end surfaces 10b and 10c abut with axial end surface 9a of the cylindrical body 9 and the axial end surface 11b of the bushing 11, respectively.

According to the above embodiment, the following advantages are provided.

(1) The engagement of the protrusions 11g of the bushing 11 with the recesses 9b of the cylindrical body 9 restricts a relative circumferential movement between the busing 11 and the rotary shaft 5 of the armature 4. The engagement of the protrusions 11d of the busing 11 with the recesses 10d of the magnet 10 restricts a relative circumferential movement between the bushing 11 and the magnet 10. Thus, the magnet 10 is held fixedly on the rotary shaft 5 and is sandwiched between the commutator 8 and the bushing 11. As a result, the magnet 10 can be fitted around the rotary shaft 5 fixedly in both circumferential and axial directions. That is, high precision in press-fitting the bushing 11 on the rotary shaft and in machining the bushing 11 and the rotary shaft 5 is not required, resulting in reduction in production cost. Further, as the magnet 10 need not be bonded to the bushing 11, the assembling process is simplified.

(2) As the bushing 11 is interposed between the bearing 6 and the magnet 10, the magnet 10 does not wear nor is damaged by the bearing 6.

(3) As the height h1 is slightly less than the thickness h2 and the height d3 is slightly less than the depth d4, the end surfaces 10b and 10c of the magnet 10 contact the end surfaces 9a and 11b directly, respectively. This contact also restricts the magnet 10 from backlashing in both axial and radial directions, thereby reducing backlash noise.

The above embodiment may be modified as follows.

(1) The diameter of the through hole 11e may be set to allow loose fitting of the bushing 11 around the rotary shaft 5. In this instance, the protrusions 11g of the bushing 11 or the recesses 9b of the cylindrical body 9 should be changed to provide a press-fitting therebetween.

(2) The recesses 10d of the magnet 10 and the protrusions 11d of the bushing 11 may be changed to protrusions and recesses, respectively.

(3) The protrusions 11d and the protrusions 11g of the bushing 11 may be spaced apart from each other in the range of 0° to 360° other than 90°.

Figure 6:
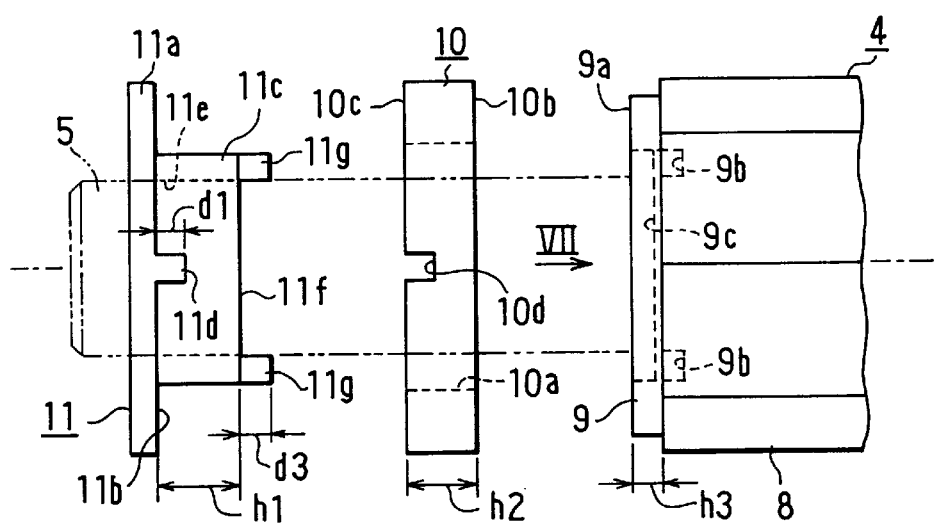
FIG. 6 is a side view showing component parts used in a modified embodiment of the present invention.
Figure 7:
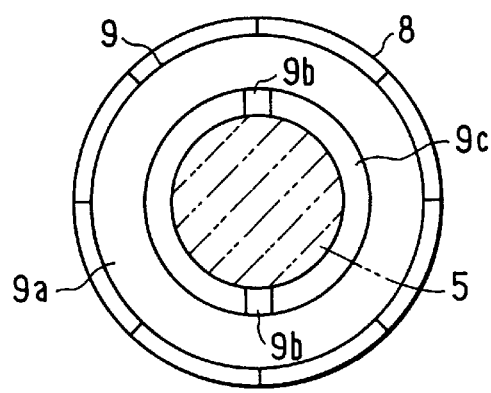
FIG. 7 is a front view showing a bushing viewed in the direction VII in FIG. 6.
Figure 8A:
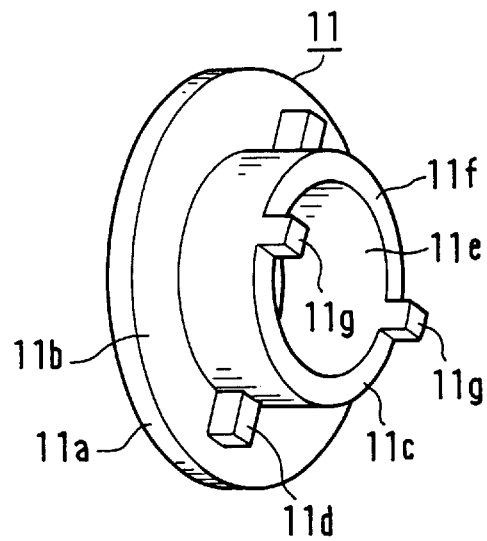
FIG. 8A is a perspective view showing a bushing used in a modified embodiment of the present invention.
Figure 8B:
FIGS. 8B to 8G are perspective views showing engagement protrusions used in modified embodiments.
Figure 8C:
Figure 8D:
Figure 8E:
Figure 8F:
Figure 8G:

(4) The height h1 of the cylindrical part 11c of the bushing 11 may be slightly greater than the thickness h2 of the magnet 10. In this instance, as shown in FIGS. 6 and 7, a recess 9c should be formed on the end surface 9a of the cylindrical body 9, and recesses 9b should be formed on the bottom of the recess 9c. Further, the depth h3 of the recess 9c should be greater than the height difference (h1–h2).

(5) The protrusions 11d of the bushing 11 may be changed to various shapes shown in FIGS. 8A to 8G. In this instance, the recesses 10d of the magnet 10 should be changed to corresponding shapes to receive the protrusions 11d therein.

Figure 9:
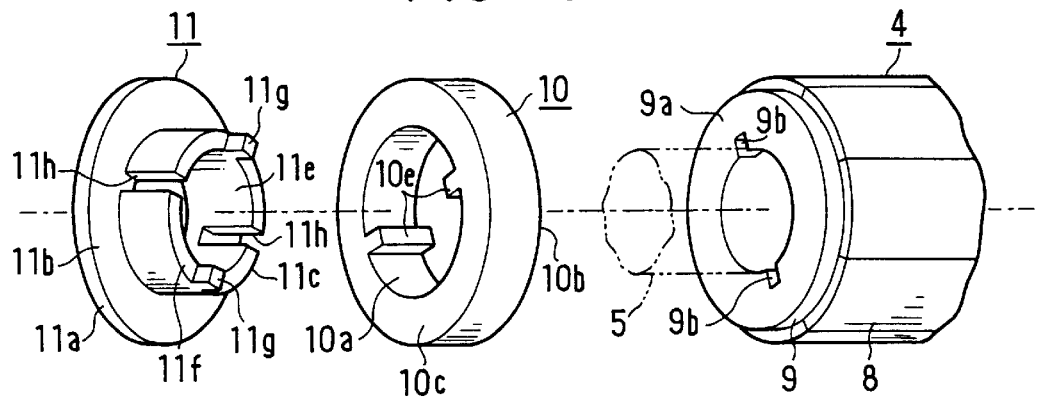
FIG. 9 is a perspective view showing component parts used in a modified embodiment of the present invention.
Figure 10:
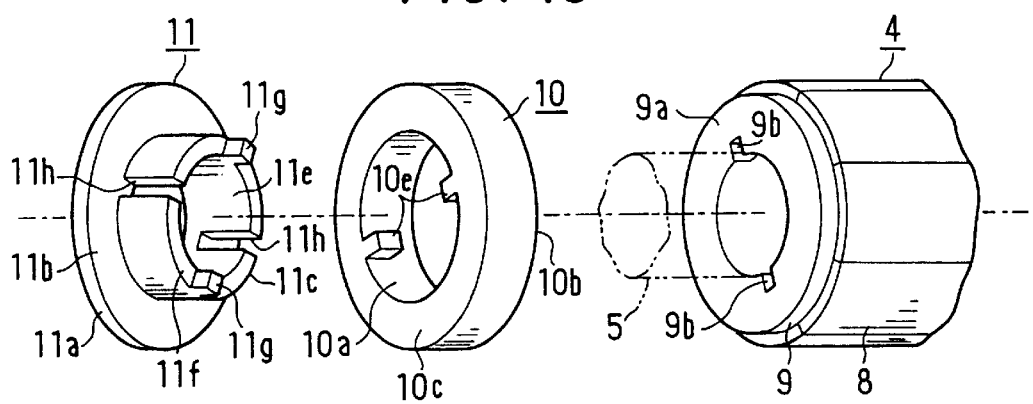
FIG. 10 is a perspective view showing the component parts used in the modified embodiment of the present invention.
Figure 11:
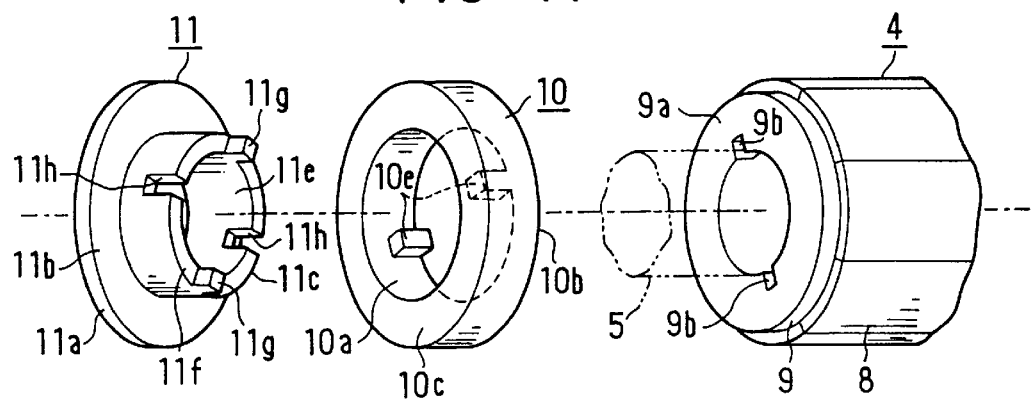
FIG. 11 is a perspective view showing the component parts used in the modified embodiment of the present invention.

(6) The protrusions 11d of the bushing 11 and the recesses 10d of the magnet 10 may be obviated as shown in FIG. 9. Specifically, the cylindrical part of the bushing 11 is formed with a pair of grooves 11h, and the magnet 10 is formed with a pair of protrusions 10e extending radially inwardly to engage with the grooves 11h. The radial extension of each protrusion 10e should be limited not to contact the rotary shaft 5. As shown in FIGS. 10 and 11, the protrusions 10e may be provided only partially in the axial direction of the magnet 10, that is, only at the side of one of the end surfaces 10c and 10b, respectively. In the case of FIG. 11, the axial length of each groove 11h may be greater than the axial length of each protrusion 10e. Each protrusion 10e of the magnet 10 may be formed into any shapes other than a square.

Figure 12:
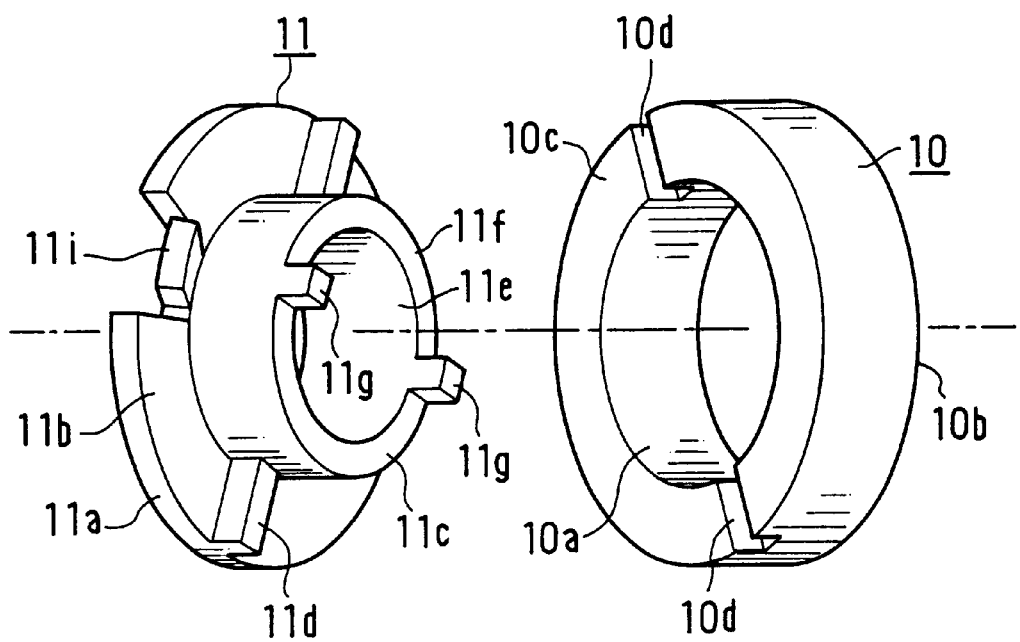
FIG. 12 is a perspective view showing a bushing used in a modified embodiment of the present invention.
Figure 13:
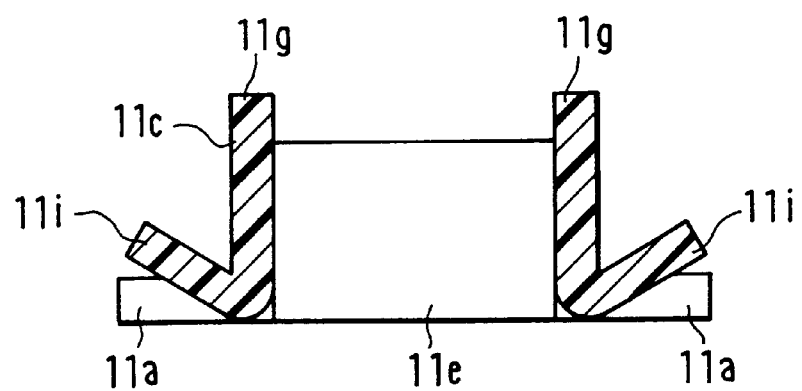
FIG. 13 is a sectional view showing the bushing shown in FIG. 12.

(7) Further, as shown in FIGS. 12 and 13, the bushing 11 may be formed with a pair of raised parts 11i, which extend from the disk part 11a toward the magnet 10. In this instance, the resiliency of the raised parts 11i keeps biasing the magnet 10 toward the cylindrical body 9, thereby restricting backlash of the magnet 10 in the axial direction.

Figure 14:
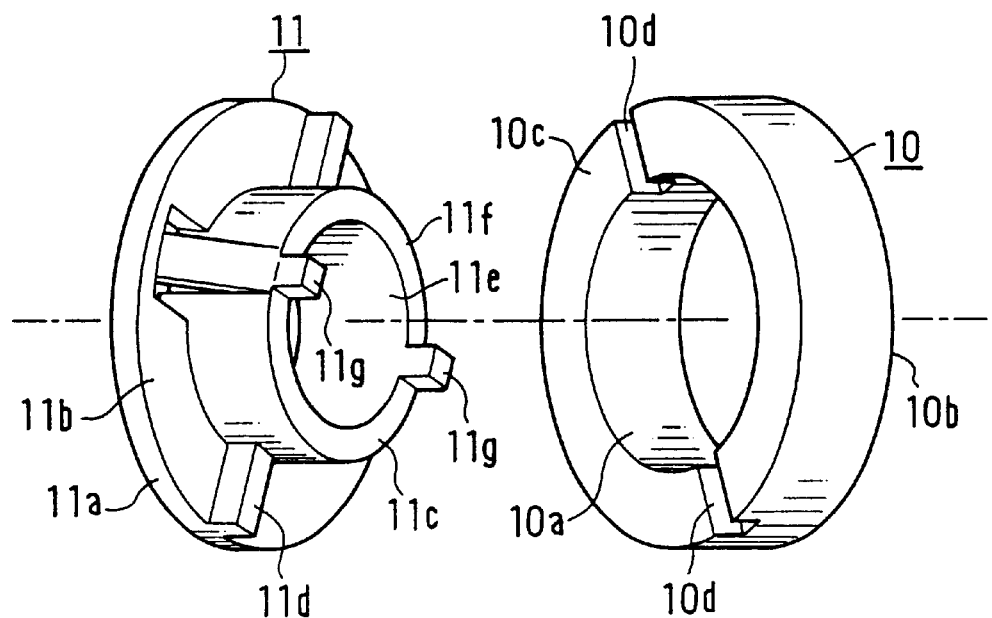
FIG. 14 is a perspective view showing a bushing used in a modified embodiment of the present invention.
Figure 15:
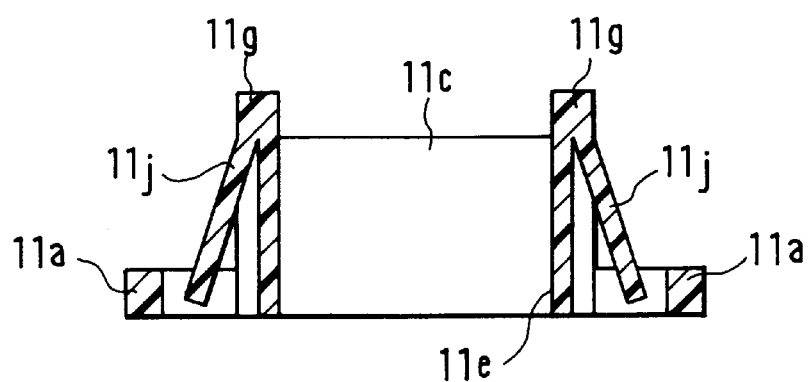
FIG. 15 is a sectional view showing the bushing shown in FIG. 14.

(8) Alternatively, as shown in FIGS. 14 and 15, the bushing 11 may be shaped to have a pair of raised parts 11j, which extends from the cylindrical part 11c toward the disk part 11a. According to this modification, the resiliency of the raised parts 11j keeps biasing the magnet 10 toward the cylindrical body 9, thereby restricting backlash of the magnet 10 in both axial and radial directions.

Figure 16:
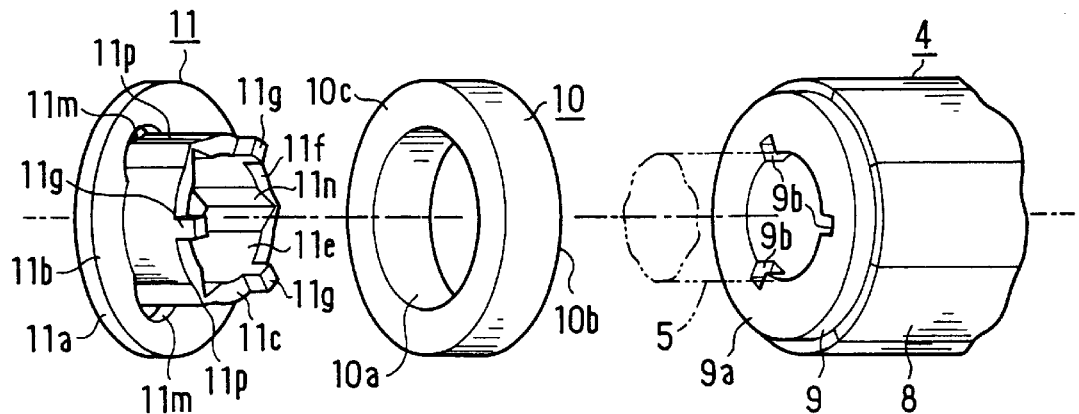
FIG. 16 is a perspective view showing component parts used in a modified embodiment of the present invention.
Figure 17A:
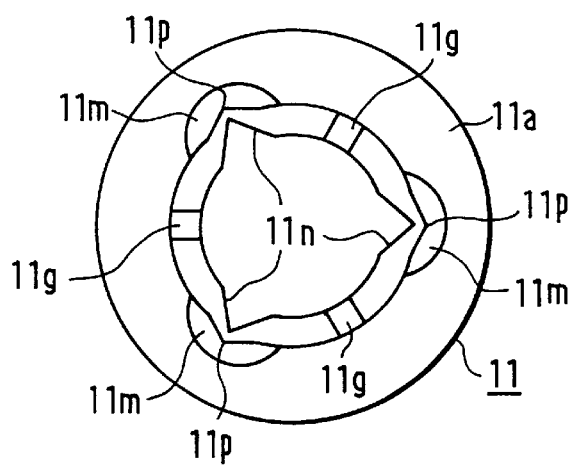
FIGS. 17A and 17B are a plan view and a sectional view showing a bushing shown in FIG. 16.
Figure 17B:
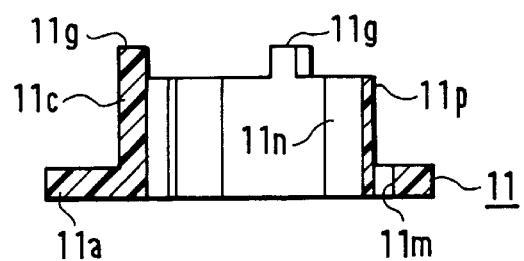

(9) Further, as shown in FIGS. 16, 17A and 17B, the cylindrical body 9 may be shaped to have three recesses 9b at equal angular intervals on its end surface 9a. the magnet 10 has no protrusions nor recesses thereon. The bushing 11 is shaped to have three arcuate through holes 11m at equal angular intervals. Each through hole 11m is formed around the outer circumference of the cylindrical part 11c at a position where the cylindrical part 11c extends from the disk part 11a. Three grooves 11n are formed on the inner peripheral surface of the cylindrical part 11c at positions radially inside of the through holes 11m. Each groove 11n extends in the axial direction and has a triangular shape in section. Three protrusions 11p are formed on the outer circumferential surface of the cylindrical part 11c at positions radially outside of the grooves 11n. Each protrusion 11p extends axially and has a triangular shape. Three protrusions 11g are formed on the end surface 11f of the cylindrical part 11c at equal angular intervals. Each protrusion 11g is positioned between adjacent two of the through holes 11m. Thus, when the cylindrical part 11c of the bushing 11 is inserted into the through hole 10a of the magnet 10, the magnet 10 is resiliently supported around the cylindrical part 11c due to resiliency of the protrusions 11p. Thus, relative movement between the magnet 10 and the bushing 11 is restricted.

Figure 18:
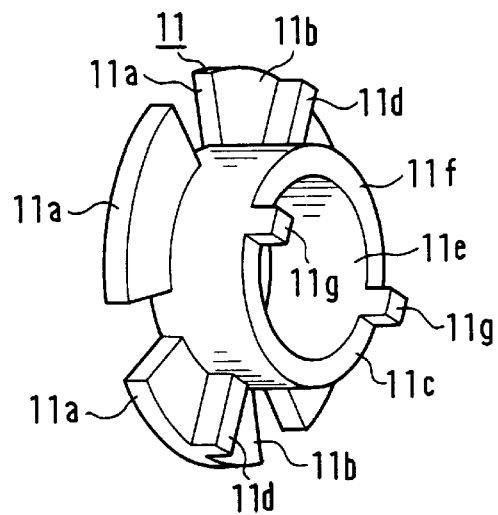
FIG. 18 is a perspective view showing component parts used in a modified embodiment of the present invention.
Figure 19:
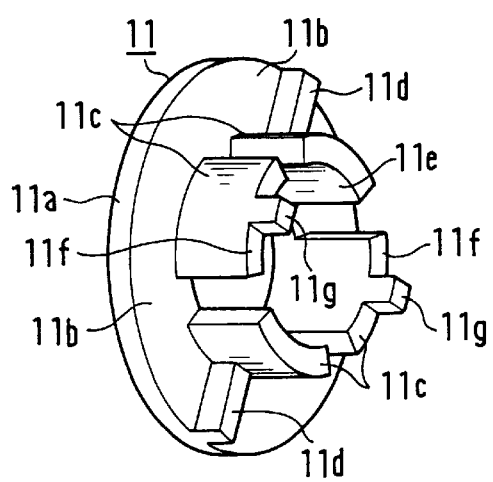
FIG. 19 is a perspective view showing component parts used in a modified embodiment of the present invention.

(10) The disk part 11a of the bushing 11 may be shaped into a plurality of ribs, which extend radially and arcuately from the cylindrical part 11c as shown in FIG. 18.

(11) The cylindrical part 11c of the bushing 11 may be shaped into a plurality of arcuate parts, each extending in the radial direction from the disk part 11a.

Figure 20:
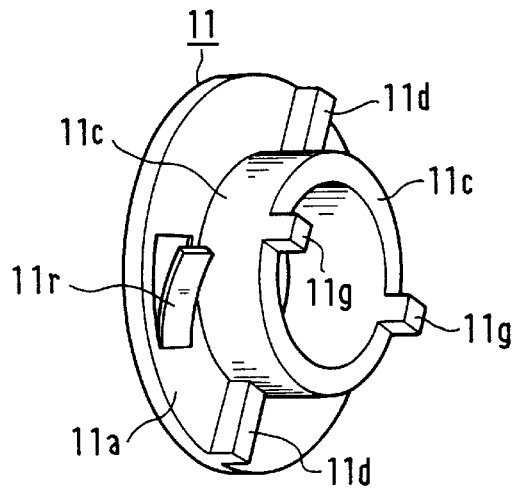
FIG. 20 is a perspective view showing component parts used in a modified embodiment of the present invention.

(12) The bushing 11 may be shaped to have a plurality of raised parts 11r extending toward the magnet 10 from the end surface of the disk part 11a facing the magnet 10 as shown in FIG. 20. According to this modification, the magnet 10 is held pressed to the cylindrical body 9 by the resiliency of the raised parts 11r, so that the axial backlash of the magnet 10 is restricted.

Figure 21:
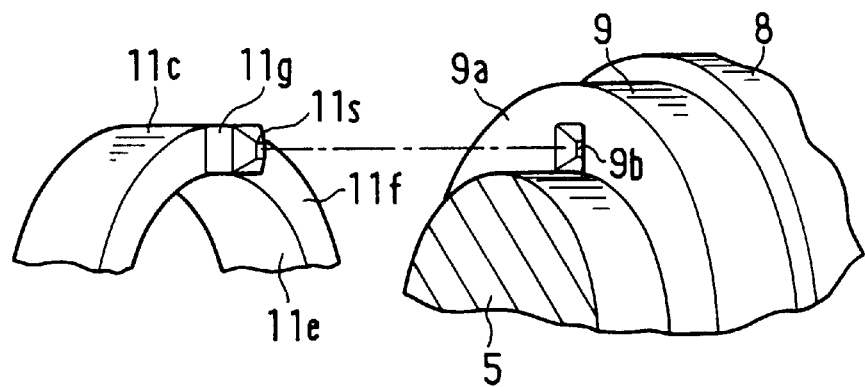
FIG. 21 is a perspective view of a bushing and a commutator used in a modified embodiment of the present invention.
Figure 22:
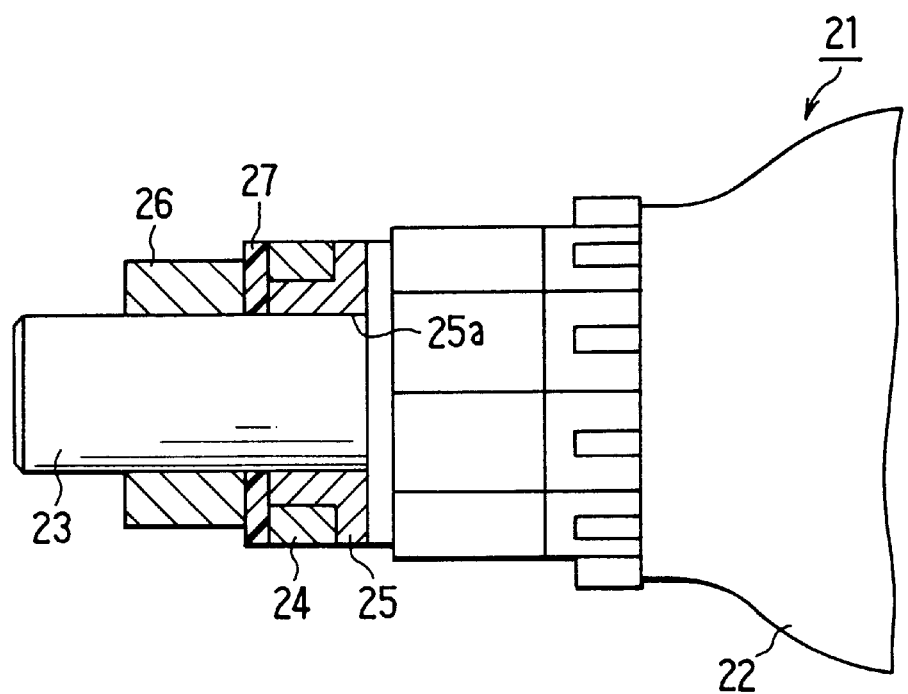
FIG. 22 is a schematic sectional view showing a conventional electric motor.

(13) Still further, as shown in FIG. 21, each protrusion 11g of the bushing 11 may be chamfered into a taper end 11s. Each recess 9b on the cylindrical body 9 should be formed also into the taper shape in correspondence with the taper end 11s. This will enable smooth engagement of the protrusion 11g into the recess 9b. The shape of each protrusion 11g may be hemispherical, conical or the like, while each recess 9b should be in a corresponding shape.

(14) The recesses 9b, 10d and protrusions 11d, 11g need not be provided symmetrically with respect to the central axis of the rotary shaft 5, and need not be provided in pair.

The present invention should not be limited to the disclosed embodiment and modifications but may be implemented in many other ways without departing from the spirit of the invention.

What is claimed is:

1. An electric motor comprising:

a stator;

a rotary shaft supported rotatably by the stator;

a commutator fixedly supported on the rotary shaft;

a rotation detection sensor having a rotary member, wherein one axial end surface of the rotary member faces one axial end surface of the commutator; and a bushing disposed on a side of another axial end surface of the rotary member and having a part extending axially from one axial end surface thereof and engaged with the commutator directly to sandwich the rotary member therebetween.

2. An electric motor of claim 1, wherein the bushing includes:

a cylindrical part fitted around the rotary shaft and supporting the rotary member thereon;

a first engagement part formed on one axial end surface of the cylindrical part and engaged with the one axial end surface of the commutator to restrict a relative rotation between the cylindrical part and the commutator;

a disk part extending radially from another axial end surface of the cylindrical part and abutting the another axial end surface of the rotary member; and a second engagement part formed on the disk part and engaged with the rotary member to restrict a relative rotation between the disk part and the rotary member.

3. An electric motor of claim 1, wherein the bushing includes:

a cylindrical part fitted around the rotary shaft and supporting the rotary member thereon;

a first engagement part formed on one axial end surface of the cylindrical part and engaged with the one axial end surface of the commutator to restrict a relative rotation between the cylindrical part and the commutator;

a disk part extending radially from another axial end surface of the cylindrical part and abutting another axial end surface of the rotary member; and a second engagement part formed on the cylindrical part and engaged with the rotary member to restrict a relative rotation between the disk part and the rotary member.

4. An electric motor of claim 2, wherein:

the first engagement part is a tapered protrusion; and the commutator has a tapered recess on the one axial end surface thereof to receive the tapered protrusion therein.

5. An electric motor of claim 2, further comprising:

a bearing fitted in a holder to support the rotary shaft therein and held in slidable contact with the disk part in an axial direction.

6. An electric motor of claim 3, wherein:

the first engagement part is a tapered protrusion; and the commutator has a tapered recess on the one axial end surface thereof to receive the tapered protrusion therein.

7. An electric motor of claim 3, further comprising:

a bearing fitted in holder to support the rotary shaft therein and held in slidable contact with the disk part in an axial direction.

8. An electric motor of claim 2, wherein the bushing includes:
a raised part extending from one of the disk part and the cylindrical part to press the rotary member resiliently to the commutator.

9. An electric motor of claim 3, wherein the bushing includes:
a raised part extending from one of the disk part and the cylindrical part to press the rotary member resiliently to the commutator.

10. An electric motor of claim 1, wherein the bushing includes:
a first engagement part extending in an axial direction through the rotary member and fixedly engaged with the commutator to restrict a relative rotation between the bushing and the commutator; and
a second engagement part fixedly engaged with the rotary member to restrict a relative rotation between the bushing and the rotary member.

* * * * *